(12) United States Patent
Heap et al.

(10) Patent No.: US 8,956,263 B2
(45) Date of Patent: Feb. 17, 2015

(54) METHOD AND APPARATUS FOR EXECUTING A TRANSMISSION RANGE SHIFT IN A MULTI-MODE POWERTRAIN SYSTEM

(75) Inventors: Anthony H. Heap, Ann Arbor, MI (US); Sean W. McGrogan, Ann Arbor, MI (US); Krunal P. Patel, Sterling Height, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 229 days.

(21) Appl. No.: 13/568,051

(22) Filed: Aug. 6, 2012

(65) Prior Publication Data

US 2014/0038773 A1 Feb. 6, 2014

(51) Int. Cl.
*H02P 17/00* (2006.01)
*B60W 10/04* (2006.01)
*B60W 10/10* (2012.01)

(52) U.S. Cl.
USPC ............... 477/15; 477/20; 477/107; 477/110

(58) Field of Classification Search
USPC ................................ 477/15, 20, 107, 110
See application file for complete search history.

(56) References Cited

U.S. PATENT DOCUMENTS

| 7,329,201 | B2 * | 2/2008 | Raghavan et al. ............ 475/151 |
| 7,645,206 | B2 | 1/2010 | Holmes et al. |
| 8,002,667 | B2 * | 8/2011 | Hsieh et al. .................... 477/15 |
| 8,630,776 | B2 * | 1/2014 | Heap et al. ..................... 701/54 |
| 2009/0118928 | A1 * | 5/2009 | Heap et al. ..................... 701/54 |
| 2010/0179009 | A1 | 7/2010 | Wittkopp et al. |

* cited by examiner

*Primary Examiner* — Tisha Lewis

(57) ABSTRACT

A method for controlling a powertrain system including an internal combustion engine coupled to a multi-mode transmission in response to a command to execute a shift from a first EVT Mode range to a second EVT Mode range includes executing a first shift from the first EVT Mode range to an intermediate transmission range. The multi-mode transmission operates in the intermediate transmission range and the engine is controlled at an engine torque command that corresponds to an output torque request. A second shift is executed from the intermediate transmission range to the second transmission range. The powertrain system operates in the second transmission range to transfer torque to an output member of the transmission.

13 Claims, 3 Drawing Sheets

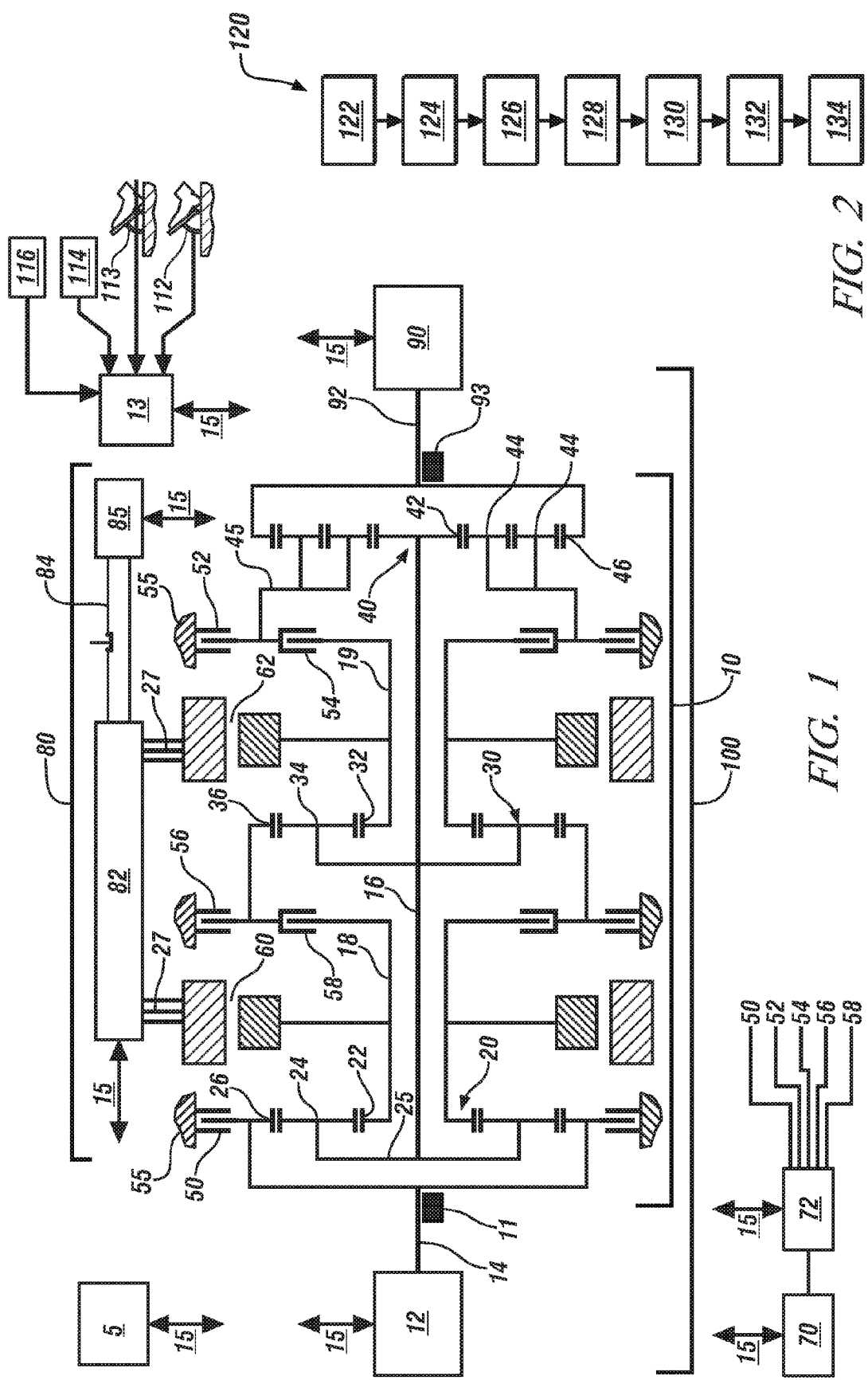

METHOD AND APPARATUS FOR EXECUTING A TRANSMISSION RANGE SHIFT IN A MULTI-MODE POWERTRAIN SYSTEM

TECHNICAL FIELD

This disclosure is related to multi-mode powertrain systems employing transmission devices, and system controls for executing range shifts.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating range and gear shifting, controlling the torque-generative devices, and regulating the electrical power interchange among the electrical energy storage device and the electric machines to manage outputs of the transmission, including torque and rotational speed.

Known transmission devices employ torque-transfer clutch devices to transfer torque between the engine, the torque machines and the driveline. Operation of a powertrain system includes activating and deactivating the clutches to effect operation in selected operating engine states and transmission ranges.

SUMMARY

A method for controlling a powertrain system including an internal combustion engine coupled to a multi-mode transmission in response to a command to execute a shift from a first EVT Mode range to a second EVT Mode range includes executing a first shift from the first EVT Mode range to an intermediate transmission range. The multi-mode transmission operates in the intermediate transmission range and the engine is controlled at an engine torque command that corresponds to an output torque request. A second shift is executed from the intermediate transmission range to the second transmission range. The powertrain system operates in the second transmission range to transfer torque to an output member of the transmission.

BRIEF DESCRIPTION OF THE DRAWINGS

One or more embodiments will now be described, by way of example, with reference to the accompanying drawings, in which:

FIG. 1 illustrates a multi-mode powertrain system including an internal combustion engine, transmission, driveline, and a controller, in accordance with the disclosure;

FIG. 2 illustrates a process in flowchart form for controlling a multi-mode powertrain system, including executing a shift in a multi-mode transmission from a first EVT Mode range to a second EVT Mode range, in accordance with the disclosure.

DETAILED DESCRIPTION

Figure 3:
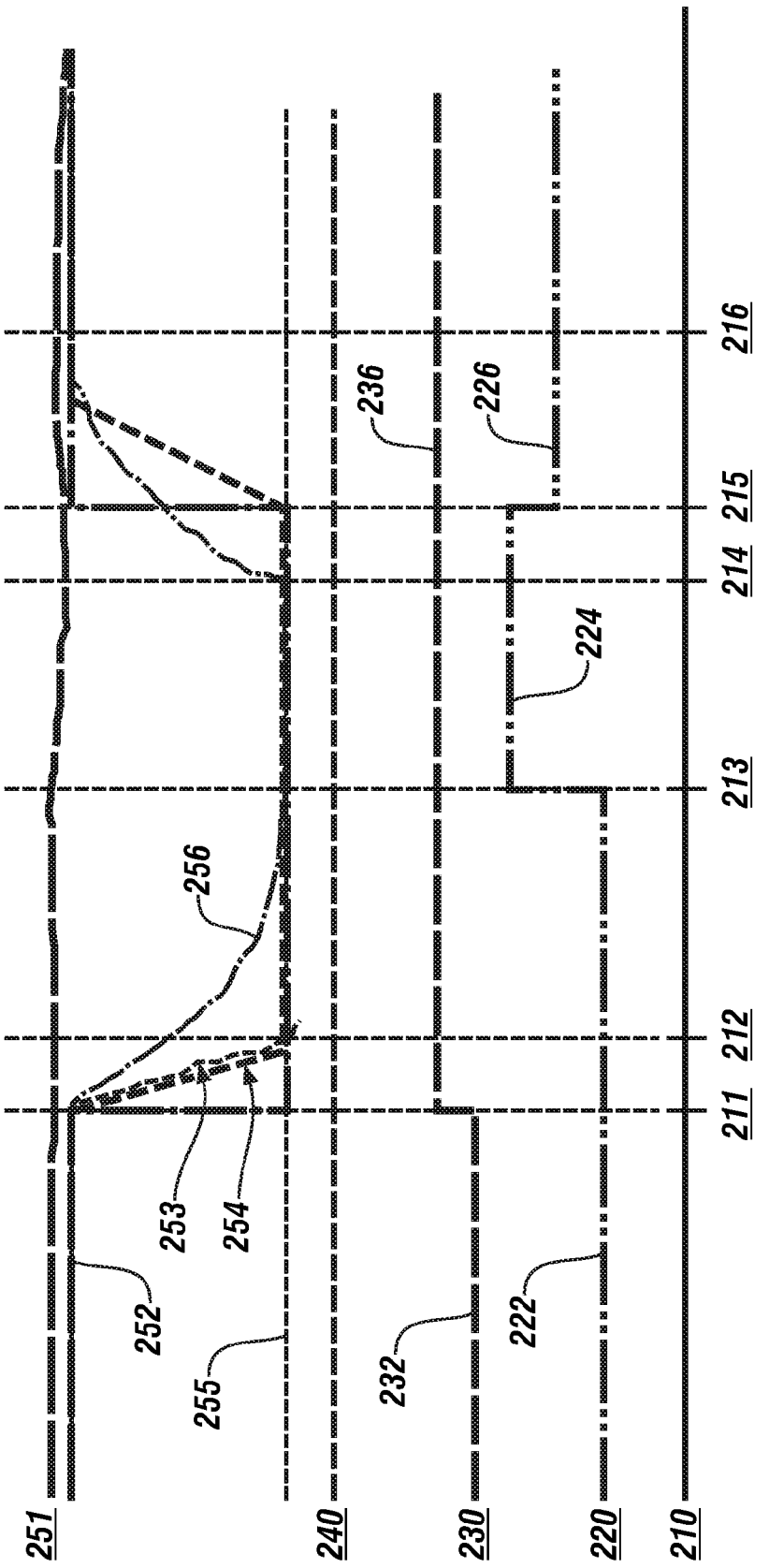
FIGS. 3 and 4 illustrates execution of the process described with reference to FIG. 2, including a plurality of engine torque commands and transmission ranges in relation to time, in accordance with the disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62, respectively, and is configured to transfer torque between the engine 12, the torque machines 60, 62, and the driveline 90. As illustrated, the first and second torque machines 60, 62 are electric motor/generators.

The high-voltage electrical system 80 includes an electrical energy storage device (ESD) 85 electrically coupled to a transmission power inverter control module (TPIM) 82 via a high-voltage electrical bus 84, and is configured with suitable devices for monitoring electric power flow including devices and systems for monitoring electric current and voltage. The ESD 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., rotational speed and engine torque can differ from the input speed and the input torque to the transmission 10 due to placement of torque-consuming components on the input member 14 between the engine 12 and the transmission 10, e.g., a torque management device or a hydraulic pump. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque.

Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the electrical energy storage device (ESD) 85. The ESD 85 is high voltage DC-coupled to the TPIM 82 via the high-voltage electrical bus 84 that preferably include a contactor switch that permits or prohibits flow of electric current between the ESD 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 85 to AC power for powering respective ones of the first and second torque machines 60 and 62, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the ESD 85 to charge and discharge the ESD 85.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of ESD 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of transmission ranges and engine states to generate and transfer torque to the driveline 90. The engine states include an on state, an off state, and a fuel cutoff state. When the engine operates in the off state, it is unfueled, not firing, and is not spinning. When the engine operates in the on state it is fueled, firing, and spinning. When the engine operates in the fuel cutoff state, it is spinning but is unfueled and not firing. The transmission ranges include a plurality of neutral (neutral), fixed gear (Gear #), variable mode (EVT Mode #), electric vehicle (EV#) and transitional (EV Transitional State# and Pseudo-gear #) ranges that are achieved by selectively activating the clutches C1 50, C2 52, C3 54, C4 56, and C5 58. A pseudo-gear range is a variable mode transmission range in which torque output from the transmission 10 corresponds to the input torque from the engine 12, taking into account torque losses associated with torque-consuming components on the input member 14. The pseudo-gear ranges are primarily employed as intermediate transmission ranges during shifts between EVT Mode ranges. Table 1 depicts a plurality of transmission ranges and engine states for operating the powertrain 100.

TABLE 1

| Range | Engine State | C1 | C2 | C3 | C4 | C5 |
|---|---|---|---|---|---|---|
| Neutral 1 | on/off | | | | | |
| Neutral 2 | on/off | | | x | | |
| Neutral 3 | on/off | | | | x | |
| Pseudo-gear 1 | on/off | x | | | | |
| Pseudo-gear 2 | on/off | | x | | | |
| Neutral | off | | | | | x |
| EVT Mode 1 | on/off | x | | x | | |
| EVT Mode 2 | on/off | x | | | x | |
| EVT Mode 3 | on/off | | x | | x | |
| EVT Mode 4 | on/off | | | x | x | |
| EV Transitional State 1 | off | x | | | | x |
| EV Transitional State 2 | off | | x | | | x |
| Gear 1 | on | x | | | x | x |
| Gear 2 | on | x | x | | x | |
| Gear 3 | on | | x | x | x | |
| EV1 | off | x | | x | | x |
| EV2 | off | x | | | x | x |
| EV3 | off | | x | | x | x |
| EV4 | off | | | x | x | x |
| EV Transitional State 3 | off | x | x | | | x |
| Neutral | on/off | | | x | x | |
| Pseudo-gear 3 | on/off | x | x | | | |
| Neutral | off | | | x | | x |
| Neutral | off | | | | x | x |

FIG. 2 schematically shows a process 120 in flowchart form for controlling a multi-mode powertrain system. The process 120 is employed to execute a shift in a multi-mode transmission from a first EVT Mode range to a second EVT Mode range. An embodiment of the multi-mode powertrain system is described with reference to FIG. 1, and includes a non-combustion torque machine and an internal combustion engine. Table 2 is provided as a key to FIG. 2, wherein the numerically labeled blocks and the corresponding functions are set forth as follows.

TABLE 2

| BLOCK | BLOCK CONTENTS |
|---|---|
| 122 | Request shift from first EVT Mode range to second EVT Mode range |
| 124 | Command shift from first EVT Mode range to intermediate transmission range |

TABLE 2-continued

| BLOCK | BLOCK CONTENTS |
|---|---|
| 126 | Execute shift to intermediate transmission range |
| 128 | Operate transmission in intermediate transmission range and control engine torque corresponding to output torque request |
| 130 | Command shift to second EVT Mode range Change long-term engine torque request, and synchronize elements of oncoming clutch in preparation to operate in the second EVT Mode range |
| 132 | Execute shift from intermediate transmission range to second EVT Mode range |
| 134 | Operate transmission in second EVT Mode range and control engine at MBT spark |

FIG. 3 graphically depicts an example of executing a shift in a multi-mode transmission from a first EVT Mode range to a second EVT Mode range employing the process 120. FIG. 3 shows a plurality of engine torque commands and transmission ranges in relation to time, which is shown on the horizontal axis 210. This example of shift execution employing the process 120 includes initially decreasing engine torque in preparation for shifting from a first, initial transmission range into an intermediate transmission range, and subsequently preloading and increasing engine torque in preparation for shifting from the intermediate transmission range to a second, desired transmission range. FIG. 3 graphically shows a present transmission range 220, a desired transmission range 230, an output torque request 240, and a plurality of engine control and operating parameters including maximum achievable engine torque 251, a long-term engine torque request (Te_Req_Pred) 252, an engine fast torque (Te_act) 253, an immediate engine torque request (Te-Immed) 254, an engine pseudo-gear torque command (Te_PG) 255, and an engine air torque (Te_air) 256 in relation to time. The engine pseudo-gear torque command 255 is a command for controlling engine torque that corresponds to the output torque request. The engine pseudo-gear torque command 255 is responsive to the output torque request from the transmission and corresponds to input torque from the engine when the transmission is operating in one of the pseudo-gear ranges. The engine fast torque 253 is an engine torque responsive to the immediate engine torque request 254 that is achieved by controlling engine torque using fast actuators such as spark in a spark-ignition engine or fuel injection timing in a compression-ignition engine. This can include retarding engine spark timing to immediately reduce engine torque, albeit with a fuel penalty. The engine air torque 256 is an engine torque responsive to the long-term engine torque request 252 that is achieved employing only changes in intake air and fuel, and is preferably at a spark timing that achieves maximum brake torque (MBT). The maximum achievable engine torque 251 remains substantially unchanged during the course of powertrain system operation described herein. The output torque request 240 remains substantially unchanged merely for purposes of describing operation of the system, although execution of the process 120 does not require the output torque request 240 to remain unchanged. The process 120 is described with reference to the multi-mode powertrain system 100 of FIG. 1, including Table 1, which depicts a plurality of powertrain states including transmission ranges and engine states for an embodiment of the powertrain 100. The concepts described herein may be applied to any multi-mode powertrain system that is configured to operate in multiple EVT Mode ranges, and is not limited to the specific embodiment of the multi-mode powertrain system 100 described herein.

Initially, as shown the present transmission range 220 is operating in a first EVT Mode range 222. The process receives a request to execute a shift from the first EVT Mode range 222 to a second EVT Mode range 226 (122) at time 211 with a change in the desired transmission range 230 from the first desired range 232 to the second desired range 236. By way of a non-limiting example, the shift from the first EVT Mode range 222 to the second EVT Mode range 226 can include a shift from EVT Mode 1 to EVT Mode 2 in the embodiment described with reference to FIG. 1. Operation in EVT Mode 1 is achieved by activating clutches C1 50 and C3 54, and operation in EVT Mode 2 is achieved by activating clutches C1 50 and C4 56. Thus a shift from EVT Mode 1 to EVT Mode 2 includes deactivating clutch C3 54 and activating clutch C4 56. Preferably, the deactivating clutch C3 54 and activating clutch C4 56 occurs sequentially and not simultaneously. Thus a shift from the first EVT Mode range 222 to the second EVT Mode range 226 includes operating in the intermediate transmission range 224, e.g., in a pseudo-gear range during a shift between EVT Mode ranges. By way of example, a shift from EVT Mode 1 to EVT Mode 2 includes operation in Pseudo-gear 1 wherein only clutch C1 50 is activated. The engine pseudo-gear torque command 255 remains unchanged during the commanded shift because the output torque request 240 is unchanged.

At time 211, the long-term engine torque request 252 changes to match the engine pseudo-gear torque command 255 to facilitate operation, and the immediate engine torque request 254 is commanded to decrease in response, reaching the engine pseudo-gear torque command 255 at time 212. The engine can be controlled to be immediately responsive to the immediate engine torque request 254 by employing the engine fast torque 253. Alternatively, the engine can be controlled to be responsive to the immediate engine torque request 254 by controlling engine torque using slow actuators that control mass air flow, shown with reference to the engine air torque 256. Just prior to time 213, the engine air torque 256 reaches the engine pseudo-gear torque command 255. When the engine torque, i.e., one of the engine fast torque 253 or the engine air torque 256 reaches the engine pseudo-gear torque command 255, an intermediate shift from the first EVT Mode range 222 to the intermediate transmission range 224, i.e., the pseudo-gear range is commanded (124). In this example, the intermediate shift from EVT Mode 1 to Pseudo-gear 1 is executed by deactivating clutch C3 54 (126). Preferably, deactivating clutch C3 54 includes off-loading torque capacity of the off-going clutch prior to deactivation. Thus, engine torque is employed to offload the off-going clutch to operate in one of the pseudo-gear ranges. If a rapid shift time is the desired, spark can be used as a fast actuator to quickly offload the clutch. If a rapid shift time is not required, a throttle can be employed to control airflow and thus control engine torque to offload the off-going clutch and operate the engine at MBT spark.

The transmission operates in the intermediate transmission range while controlling engine torque to correspond to the output torque request 240 (128). In this example, the transmission operates in the pseudo-gear range with only clutch C1 50 activated, and the engine operates to achieve the engine pseudo-gear torque command 255 in response to the output torque request 240. When operating in one of the pseudo-gear ranges, there is a direct torque coupling between engine torque and the transmission output torque. Engine torque is commanded in response to the output torque request. When there is a need for precise control of the output torque for a transient maneuver or a transmission lash transition, the engine torque controls the output torque via control of fast actuators or slow actuators, depending upon the rate of change in the output torque request and required response time.

At time 214, the long-term engine torque request 252 changes and operation of the system is controlled to synchronize elements of the oncoming clutch in preparation to operate in the second EVT Mode range 226 (130). When the second EVT Mode range 226 is EVT Mode 2, the long-term engine torque request 252 increases in anticipation of a need to increase engine torque during operation in the second EVT Mode range 226 and the control system synchronizes speeds of elements of the oncoming clutch C4 56. Changing the engine torque by increasing the torque requires increasing air intake into the engine, and thus the engine air torque 256 is commanded to increase to preload torque capability of the engine prior to activating the oncoming clutch. Engine torque output is limited by retarding spark timing relative to the MBT spark timing. However the immediate engine torque request 254 and the engine fast torque 253 continue correspond to the engine pseudo-gear torque command 255 that is determined in response to the output torque request 240 while the transmission 10 executes speed controls to synchronize elements of the oncoming clutch, e.g., clutch C4 56 in this example. As illustrated, the magnitude of the long-term engine torque request 252 for operating in EVT Mode 2 is the same as the magnitude of the long-term engine torque request 252 for operating in EVT Mode 1, but this is only for purposes of illustration.

At time 215, the transmission executes an intermediate shift from the intermediate transmission range 224 to the second EVT Mode range 226 by activating the oncoming clutch (132). In this example, the intermediate shift from Pseudo-gear 1 to EVT Mode 2 is executed by activating oncoming clutch C4 56. The immediate engine torque request 254 and the corresponding engine fast torque 253 are commanded to transition in response. Preferably, activating clutch C4 56 includes synchronizing elements of the oncoming clutch prior to activation. The engine torque capability is pre-loaded by increasing intake airflow and controlling torque output by controlling spark timing prior to activating the oncoming clutch to permit a rapid engine response when the oncoming clutch has sufficient torque capacity to carry clutch torque when a quick engine response is desired to execute the intermediate shift from the intermediate transmission range 224 to the second EVT Mode range 226.

At time 216, execution of the shift from the first EVT Mode range to the second EVT Mode range is completed, as the clutches are activated and the transmission operates in the second EVT Mode range with the engine operating at MBT spark. The powertrain system 100 commands and coordinates torque outputs from the engine 12 and the first and second torque machines 60 and 62 in response to the output torque request (134).

Figure 4:
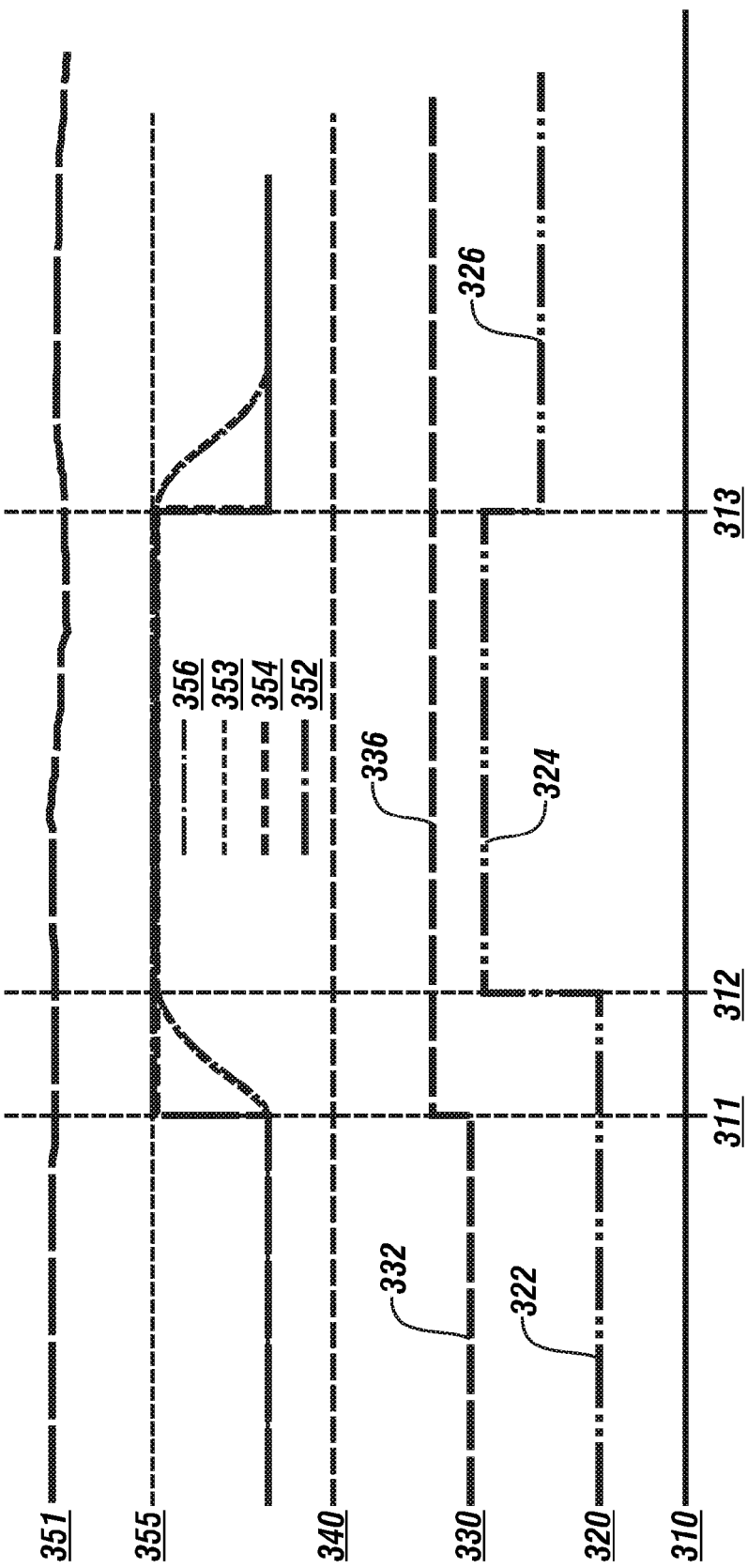

FIG. 4 graphically depicts another example of executing a shift in a multi-mode transmission from a first EVT Mode range to a second EVT Mode range employing the process 120. FIG. 4 shows a plurality of engine torque commands and transmission ranges in relation to time, which is shown on the horizontal axis 310. This example of shift execution employing the process 120 includes initially preloading and increasing engine torque in preparation for shifting from a first, initial transmission range into an intermediate transmission range, and subsequently decreasing engine torque as part of shifting from the intermediate transmission range to a second, desired transmission range. FIG. 4 graphically shows a present transmission range 320, a desired transmission range 330, an output torque request 340, and a plurality of engine control and operating parameters including maximum achievable engine torque 351, a long-term engine torque request (Te_Req_Pred) 352, an engine fast torque command (Te_act) 353, an immediate engine torque request (Te-Immed) 354, an engine pseudo-gear torque command (Te_PG) 355, and an engine air torque command (Te_air) 356 in relation to time.

Initially, as shown the present transmission range 220 is operating in a first EVT Mode range 322. The process receives a request to execute a shift from a first EVT Mode range to a second EVT Mode range (122) at time 311 with a change in the desired transmission range 230 from the first desired range 332 to the second desired range 336. By way of a non-limiting example, the shift from the first EVT Mode range 322 to the second EVT Mode range 326 can include a shift from EVT Mode 2 to EVT Mode 1 in the embodiment described with reference to FIG. 1. A shift from the first EVT Mode range 322 to the second EVT Mode range 326 includes operating in the intermediate transmission range 324, e.g., in a pseudo-gear range during a shift between EVT Mode ranges. The engine pseudo-gear torque command 355 remains unchanged during the commanded shift because the output torque request 340 is unchanged.

At time 311, the long-term engine torque request 352 changes to match the engine pseudo-gear torque command 355 to facilitate operation, and the immediate engine torque request 354 is commanded to increase in response. The engine responds to the immediate engine torque request 354 by controlling engine torque using slow actuators that control mass air flow, shown with reference to the engine air torque command 356, which coincide with the engine fast torque command 353 during commanded increases in engine torque. At time 312, the engine air torque command 356 reaches the engine pseudo-gear torque command 355. When the engine torque, i.e., one of the engine fast torque command 353 or the engine air torque command 356 reaches the engine pseudo-gear torque command 355, an intermediate shift from the first EVT Mode range 322 to the intermediate transmission range 324, i.e., the pseudo-gear range is commanded.

The transmission operates in the intermediate transmission range while controlling engine torque to correspond to the output torque request 340. When operating in one of the pseudo-gear ranges, there is a direct torque coupling between engine torque and the transmission output torque. Engine torque is commanded in response to the output torque request. When there is a need for precise control of the output torque for a transient maneuver or a transmission lash transition, the engine torque controls the output torque via control of fast actuators or slow actuators, depending upon the rate of change in the output torque request and required response time.

Prior to time 313, operation of the system is controlled to synchronize elements of the oncoming clutch in preparation to operate in the second EVT Mode range 326. At time 313, the transmission executes an intermediate shift from the intermediate transmission range 324 to the second EVT Mode range 326 by activating the oncoming clutch and decreasing the long-term engine torque request 352. The immediate engine torque request 354 is commanded to transition in response. The corresponding engine fast torque command 353 and the engine air torque 256 change in response. At time 313, execution of the shift from the first EVT Mode range to the second EVT Mode range is completed, as the clutches are activated and the transmission operates in the second EVT Mode range with the engine operating at MBT spark. The powertrain system 100 commands and coordinates torque outputs from the engine 12 and the first and second torque machines 60 and 62 in response to the output torque request.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a powertrain system including an internal combustion engine coupled to a multi-mode transmission in response to a command to execute a shift in the multi-mode transmission from a first EVT Mode range to a second EVT Mode range, comprising:
   executing a first shift from the first EVT Mode range to an intermediate transmission range, comprising:
      controlling the engine to achieve an engine torque command that corresponds to an output torque request; and
      deactivating an off-going clutch to operate in the intermediate transmission range;
   operating in the intermediate transmission range and controlling the engine at the engine torque command that corresponds to the output torque request;
   executing a second shift from the intermediate transmission range to the second transmission range; and
   operating in the second transmission range to transfer torque to an output member of the transmission.

2. The method of claim 1, wherein controlling the engine torque to achieve the engine torque command that corresponds to the output torque request comprises controlling engine torque employing a fast actuator to immediately reduce engine torque in response to the output torque request.

3. The method of claim 2, wherein controlling engine torque employing a fast actuator comprises retarding engine spark timing.

4. The method of claim 2, wherein controlling the engine torque employing a fast actuator comprises retarding fuel injection timing.

5. The method of claim 1, wherein controlling the engine to achieve the engine torque command that corresponds to the output torque request comprises controlling engine torque employing a slow engine actuator to reduce engine torque at a spark timing that achieves maximum brake torque in response to the output torque request.

6. The method of claim 1, wherein executing a second shift from the intermediate transmission range to the second transmission range comprises increasing engine air intake and retarding spark timing to preload torque capability of the engine and synchronizing elements of an oncoming clutch, and then activating the oncoming clutch and adjusting the spark timing to achieve maximum brake torque in response to the output torque request.

7. The method of claim 1, wherein operating in the second transmission range to transfer torque to the output member of the transmission comprises operating in the second transmission range to transfer torque among the engine, a plurality of torque machines, and the output member.

8. A method for shifting a multi-mode transmission from a first transmission range to a second transmission range, comprising:
   executing a first shift from the first transmission range to an intermediate transmission range, comprising:
      controlling an engine to achieve an engine torque command that corresponds to an output torque request; and
      deactivating an off-going clutch to operate in the intermediate transmission range;
   operating in the intermediate transmission range and controlling the engine at the engine torque command that corresponds to the output torque request, said engine configured to transfer torque to an input member of the transmission;
   executing a second shift from the intermediate transmission range to the second transmission range; and
   operating in the second transmission range to transfer torque among the engine, a plurality of torque machines, and an output member of the transmission.

9. The method of claim 8, wherein the first transmission range comprises a first EVT Mode range and the second transmission range comprises a second EVT Mode range.

10. The method of claim 8, wherein controlling the engine to achieve the engine torque command that corresponds to the output torque request comprises retarding engine spark timing to effect controlling the engine to immediately reduce engine torque in response to the output torque request.

11. The method of claim 8, wherein controlling the engine torque to achieve the engine torque command that corresponds to the output torque request comprises controlling engine airflow to effect controlling the engine torque to reduce engine torque in response to the output torque request.

12. The method of claim 8, wherein executing a second shift from the intermediate transmission range to the second transmission range includes increasing engine air intake and retarding spark timing to preload torque capability of the engine and synchronizing elements of an oncoming clutch, and then activating the oncoming clutch and adjusting the spark timing to achieve maximum brake torque in response to the output torque request.

13. A method for controlling a powertrain system comprising an internal combustion engine coupled to a multi-mode transmission, comprising:
   commanding a range shift in the multi-mode transmission;
   controlling the engine to achieve an engine torque command that corresponds to an output torque request;
   deactivating an off-going clutch;
   operating in an intermediate transmission range and controlling the engine at the engine torque command that corresponds to the output torque request;
   increasing engine air intake and retarding spark timing to preload torque capability of the engine and synchronizing elements of an oncoming clutch;
   activating the oncoming clutch and adjusting the spark timing to achieve maximum brake torque in response to the output torque request; and
   operating in the second transmission range to transfer torque to an output member of the transmission.

* * * * *